US 8,154,735 B2

(12) United States Patent
Yang et al.

(10) Patent No.: US 8,154,735 B2
(45) Date of Patent: Apr. 10, 2012

(54) APPARATUS FOR MEASURING QUASI-STATIC ERROR OF ROTATION DRIVING SHAFT

(75) Inventors: Seung-Han Yang, Daegu (KR); Sung-Ryung Park, Daegu (KR)

(73) Assignee: Kyungpook National University Industry-Academic Corporation Foundation, Daegu (KR)

(*) Notice: Subject to any disclaimer, the term of this patent is extended or adjusted under 35 U.S.C. 154(b) by 218 days.

(21) Appl. No.: 12/770,352

(22) Filed: Apr. 29, 2010

(65) Prior Publication Data
US 2010/0302552 A1 Dec. 2, 2010

(30) Foreign Application Priority Data
May 13, 2009 (KR) .................. 10-2009-0041713

(51) Int. Cl.
*G01B 11/14* (2006.01)
(52) U.S. Cl. ........ 356/614; 356/616; 356/622; 356/138; 250/234
(58) Field of Classification Search .................. 356/514, 356/616, 622, 623, 138; 250/234, 216; 73/862.342, 73/762, 800
See application file for complete search history.

(56) References Cited

U.S. PATENT DOCUMENTS

| | | | | |
|---|---|---|---|---|
| 4,523,093 A * | 6/1985 | Neumann | ...................... | 250/234 |
| 6,460,422 B1 * | 10/2002 | Kuroda et al. | ............ | 73/862.324 |
| 6,486,957 B1 * | 11/2002 | Braumann et al. | ............. | 356/416 |
| 7,104,133 B2 * | 9/2006 | Kuroda et al. | ................... | 73/650 |
| 2002/0054298 A1 * | 5/2002 | Tenjimbayashi | ............... | 356/614 |
| 2004/0263840 A1 * | 12/2004 | Segall et al. | ................ | 356/243.1 |
| 2005/0286060 A1 * | 12/2005 | Beatson et al. | ................ | 356/614 |
| 2006/0261262 A1 * | 11/2006 | Goto | ............................. | 250/234 |

* cited by examiner

*Primary Examiner* — Sang Nguyen
(74) *Attorney, Agent, or Firm* — Lowe Hauptman Ham & Berner LLP

(57) ABSTRACT

In an apparatus for measuring a quasi-static error of a rotation driving shaft, a positional error and an angular error in each of X, Y, and Z axis directions during rotation of a driving shaft is measured by means of a single measurement apparatus. In the apparatus, a first splitter, a second splitter, and a reflector spectrally output or reflect a laser beam, which is output from a laser driving device, to a first position sensor and a second position sensor, so that it is possible to obtain every error information on positional errors and angular errors in X, Y, and Z axis directions of a rotation driving shaft through input position change data of the inputted laser beam.

8 Claims, 7 Drawing Sheets

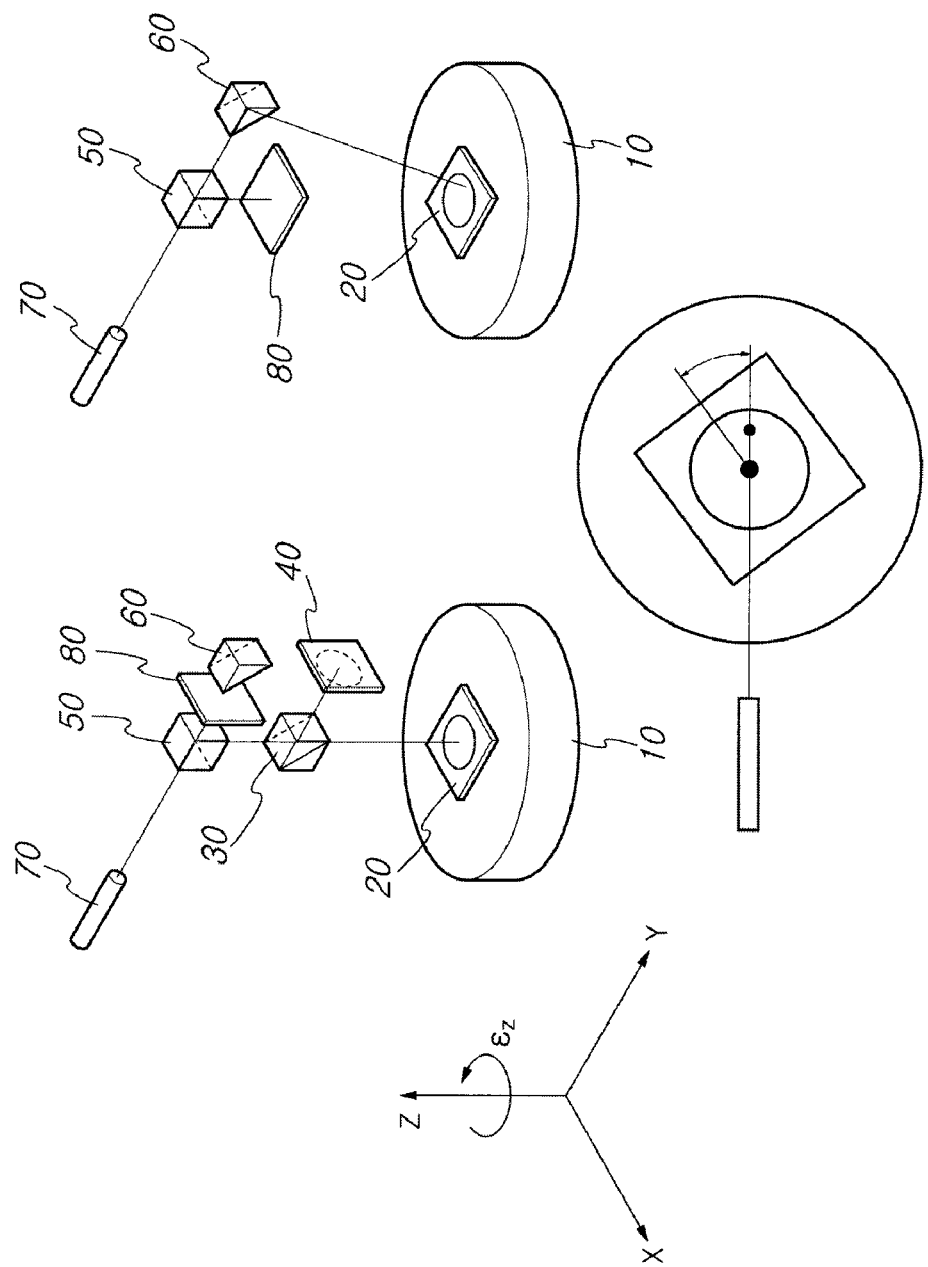

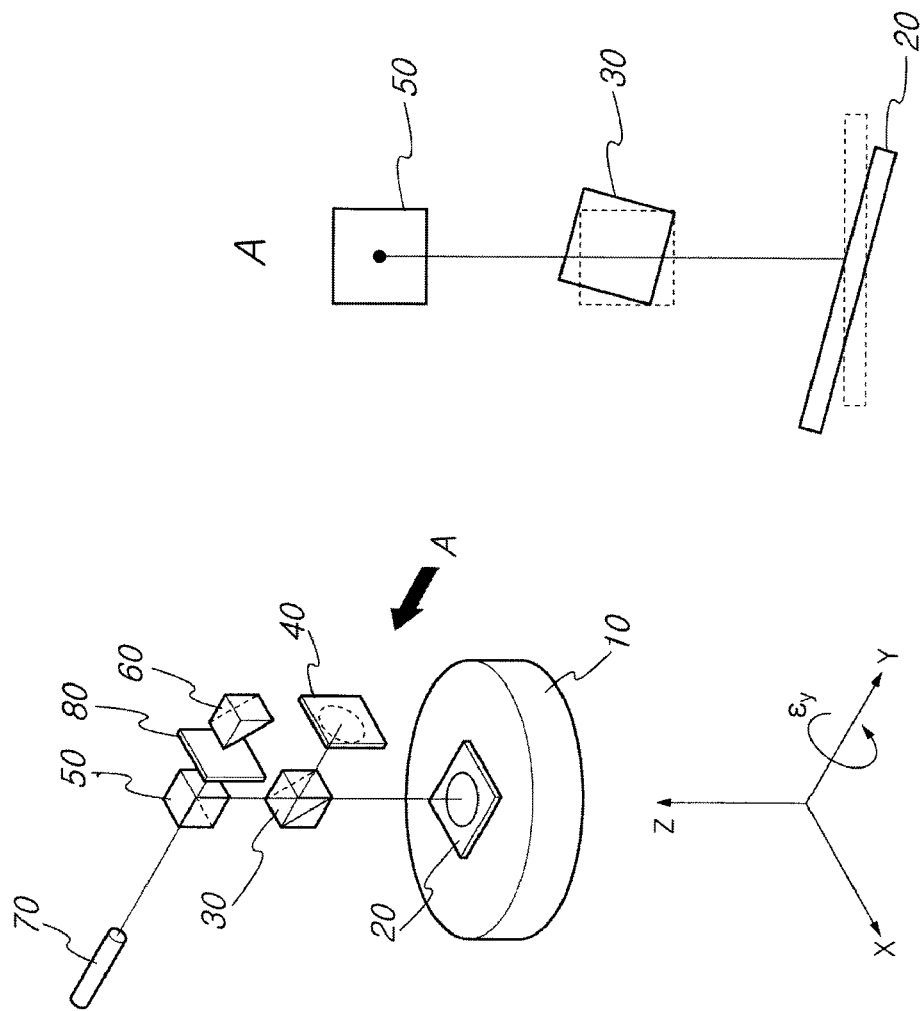

APPARATUS FOR MEASURING QUASI-STATIC ERROR OF ROTATION DRIVING SHAFT

CROSS REFERENCE TO RELATED APPLICATION

This application claims the priority of Korean Patent Application No. 10-2009-0041713, filed on May 13, 2009 in the KIPO (Korean Intellectual Property Office), the disclosure of which are incorporated herein in their entirety by reference.

TECHNICAL FIELD

The present invention relates to an apparatus for measuring a quasi-static error of a rotation driving shaft, in which a positional error and an angular error in each of X, Y, and Z axis directions during rotation of a driving shaft can be measured by means of a single measurement apparatus. More particularly, the present invention relates to an apparatus for measuring a quasi-static error of a rotation driving shaft, in which a first splitter, a second splitter, and a reflector spectrally output or reflect a laser beam, which is output from a laser driving device, to a first position sensor and a second position sensor, so that it is possible to obtain every error information on positional errors and angular errors in X, Y, and Z axis directions of a rotation driving shaft through input position change data of the inputted laser beam.

BACKGROUND ART

In general, during rotation of a machine-worked product, a rotation shaft of a motor, or a main spindle of a machine tool, which has a cylindrical shape, there is generated a positional error, which corresponds to their displacement during rotation in X, Y, and Z axis directions, and an angular error, which corresponds to their tilting during rotation with respect to the X, Y, and Z axis directions, based on their normal positions.

In order to correct the positional error and angular error, a measurement of an error value should be done in advance through a measurement apparatus. In this respect, various types of apparatuses for measuring the positional error and angular error are conventionally disclosed.

However, there is no disclosed technology enabling one general measurement apparatus to measure 6 error components of the above described rotation driving shaft, i.e. both the positional error and the angular error with respect to each of the X, Y, and Z axis directions. Therefore, it has required selecting the measurement apparatus appropriate for the error type to be measured or using two or more measurement apparatuses if it is desired to measure every error component.

In this respect, it is essentially necessary to develop an apparatus for measuring a quasi-static error which can measure 6 error components by means of a single apparatus, thereby achieving an easy and prompt error measurement.

DISCLOSURE

Technical Problem

Accordingly, the present invention has been made to solve the above-mentioned problems occurring in the prior art, and the present invention provides an apparatus for measuring a quasi-static error of a rotation driving shaft, in which a first splitter, a second splitter, and a reflector spectrally output or reflect a laser beam, which is output from a laser driving device, to a first position sensor and a second position sensor, so that it is possible to obtain every error information on positional errors and angular errors in X, Y, and Z axis directions of a rotation driving shaft through input position change data of the inputted laser beam.

Technical Solution

In accordance with an aspect of the present invention, there is provided an apparatus for measuring a quasi-static error for measuring a positional error and an angular error generated in each of X, Y, and Z axis directions of a rotating driving shaft through a position detection sensor for sensing an input position of a laser beam, the apparatus including: a first position sensor for sensing the input position of the laser beam, the first position sensor being disposed on a center of an upper surface of the driving shaft; a first splitter for spectrally outputting an inputted laser beam as a straight directional laser beam component and horizontal directional laser beam component so that the straight directional laser beam component is inputted to the first position sensor, the first splitter being spaced apart from the first position sensor at a predetermined distance on an extension line of an upper part of the driving shaft and fixed to the driving shaft to rotate together with the driving shaft; a second position sensor spaced apart from the first splitter at a predetermined distance in a horizontal spectral direction of the first splitter so as to receive the horizontal directional laser beam component spectrally outputted from the first splitter and fixed to the driving shaft to rotate together with the driving shaft; a second splitter for spectralizing the inputted laser beam into a straight directional laser beam component and down-vertical directional laser beam component, the second splitter being spaced apart from an upper part of the first splitter on an extension line of the upper part of the driving shaft; a reflector for receiving the straight directional laser beam component split from the second splitter and reflecting the received laser beam component to the first position sensor; a laser driving device disposed on a same horizontal extension line of the second splitter and reflector and opposed to the reflector based on the second splitter, to irradiate the laser beam to the second splitter; and a blocking plate for selectively blocking the straight directional or vertical directional laser beam component split from the second splitter.

The apparatus sequentially performs a first step in which the blocking plate located between the second splitter and the reflector blocks the horizontal directional laser beam component spectrally outputted from the second splitter so that the vertical directional laser beam component outputted from the second splitter is inputted to the first position sensor and second position sensor through the first splitter, and a second step in which the blocking plate located between the second splitter and the first splitter blocks the vertical directional laser beam component spectrally outputted from the second splitter so that the laser beam component is inputted to the first position sensor through the reflector.

Further, the positional error generated in each of X and Y axis directions is obtained through a laser input position change data measured by the first position sensor and second position sensor in the first step, and the positional error generated in a Z axis direction is obtained through a laser input position change data measured by the first position sensor in the second step.

Further, the angular error in each of X and Y axis directions is obtained through combination of laser input position change data measured by the first position sensor and second position sensor in the first step and the angular error in a Z axis direction is obtained through combination of laser input position change data measured by the first position sensor in the first step and second step.

Here, the positional errors and the angular errors in the X, Y, and Z axis directions are obtained by an equation defined by $AX = B$, wherein $$A = \begin{bmatrix} -\tan\beta\cos\theta & -\tan\beta\sin\theta & \sin\theta & x_1 & 0 & -a\tan\beta\cos\theta \\ \tan\beta\sin\theta & -\tan\beta\cos\theta & \cos\theta & y_1 & 0 & -a\tan\beta\sin\theta \\ -\cos\theta & -\sin\theta & 0 & 0 & 0 & 0 \\ \sin\theta & -\cos\theta & 0 & 0 & 0 & 0 \\ -\cos\theta & -\sin\theta & 0 & \sin\theta H_1 - \sin\theta H_2 - x_3\cos\theta & -\cos\theta H_1 + \cos\theta H_2 - x_3\sin\theta & 0 \\ -\sin\theta & \cos\theta & 0 & -\cos\theta H_1 + \cos\theta H_2 - z_3\cos\theta & -\sin\theta H_1 + \sin\theta H_2 - z_3\sin\theta & 0 \end{bmatrix},$$

$$X = \begin{bmatrix} \delta_x \\ \delta_y \\ \delta_z \\ \varepsilon_x \\ \varepsilon_y \\ \varepsilon_z \end{bmatrix}, \text{ and } B = \begin{bmatrix} \tan\beta x_1 - a\tan\beta\sin\theta \\ \tan\beta y_1 - a\tan\beta\cos\theta \\ x_2 \\ y_2 \\ x_3 \\ z_3 \end{bmatrix},$$

in which $\theta$ is a rotation angle of the rotation driving shaft, $\beta$ is an incidence angle of the first position sensor of the spectral laser beam reflected from the reflector, $\alpha$ is the distance between the incidence point of the first position sensor of the spectral laser beam reflected from the reflector and the center point of the first position sensor, $H_1$ is the shortest distance between the driving shaft and the second position sensor, $H_2$ is the shortest distance between a point that is the shortest distance between the driving shaft and the second position sensor and the center point of the driving shaft, $\epsilon_x$, $\epsilon_y$, and $\epsilon_z$ are the angular errors in the X, Y, and Z axis directions, respectively, $\delta_x$, $\delta_y$, and $\delta_z$ are the positional errors in the X, Y, and Z axis directions, respectively, $x_1$ is an output value in the X direction of the first position sensor in the first step, $y_1$ is an output value in the Y direction of the first position sensor in the first step, $x_2$ is an output value in the X direction of the first position sensor in the second step, $y_2$ is an output value sensor in the Y direction of the first position sensor in the second step, $x_3$ is an output value in the X direction of the second position sensor in the first step, and $z_3$ is an output value in the Z direction of the second position sensor in the first step.

Advantageous Effects

Accordingly, the apparatus for measuring the quasi-static error of the rotation driving shaft of the present invention can obtain 6 quasi-static errors created during the rotation of the driving shaft, i.e. the positional error and angular error in each of X, Y, and Z axis directions, by using the combination of the laser beam that is outputted from the laser driving device and split from the first splitter and second splitter.

BRIEF DESCRIPTION OF THE DRAWINGS

The above and other aspects, features and advantages of the present invention will be more apparent from the following detailed description taken in conjunction with the accompanying drawings, in which:

FIG. 6 is a diagram illustrating an angular error in a Z axis direction; and

FIG. 7 is a diagram illustrating an angular error in a Y axis direction.

BEST MODE

Mode for Invention

Hereinafter, an apparatus for measuring a quasi-static error of the present invention will be described with reference to the accompanying drawings in detail.

Figure 1:
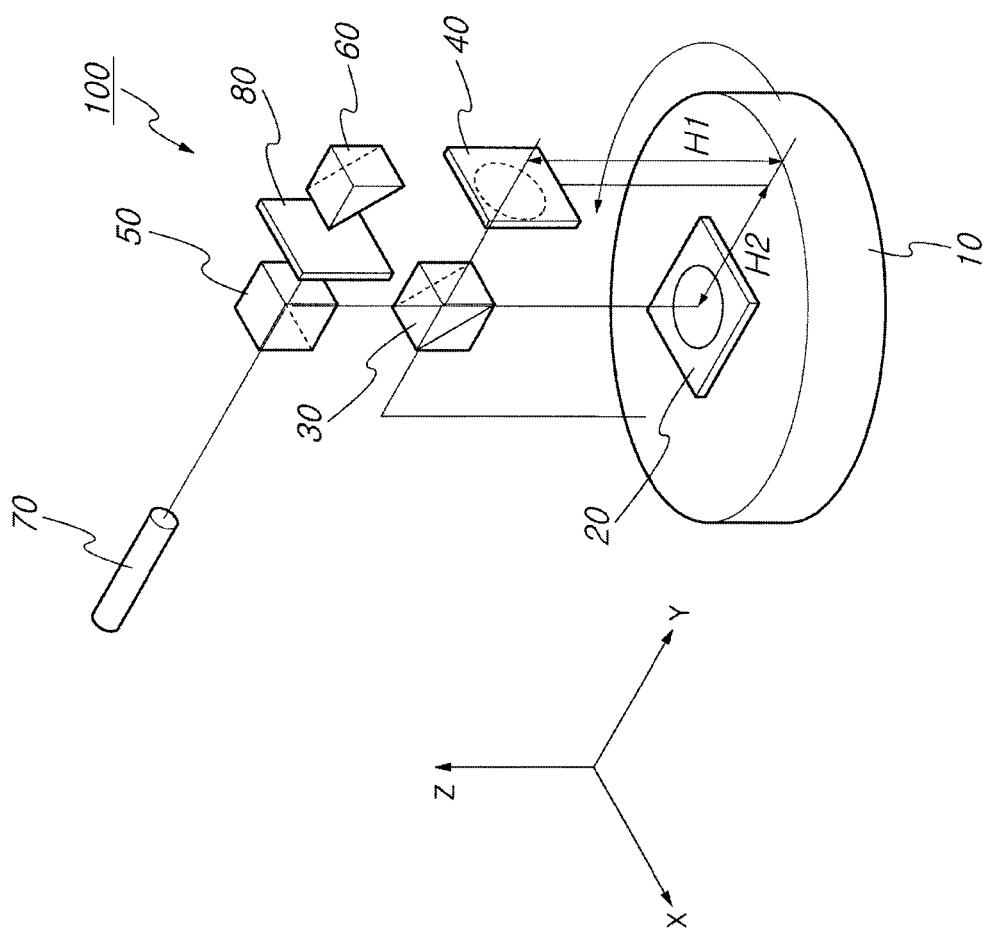
FIG. 1 is a diagram illustrating the first step measurement in an apparatus for measuring a quasi-static error of a rotation driving shaft according to the present invention.
Figure 2:
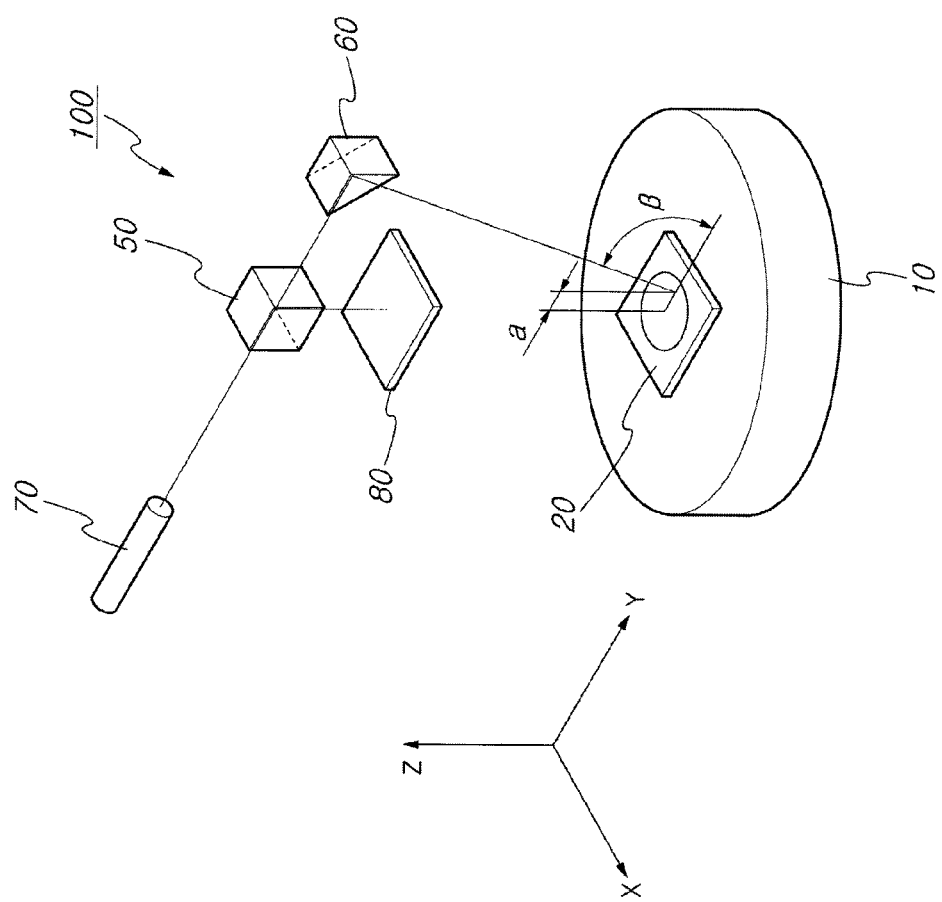
FIG. 2 is a diagram illustrating the second step measurement in an apparatus for measuring a quasi-static error of a rotation driving shaft according to the present invention.
Figure 3:
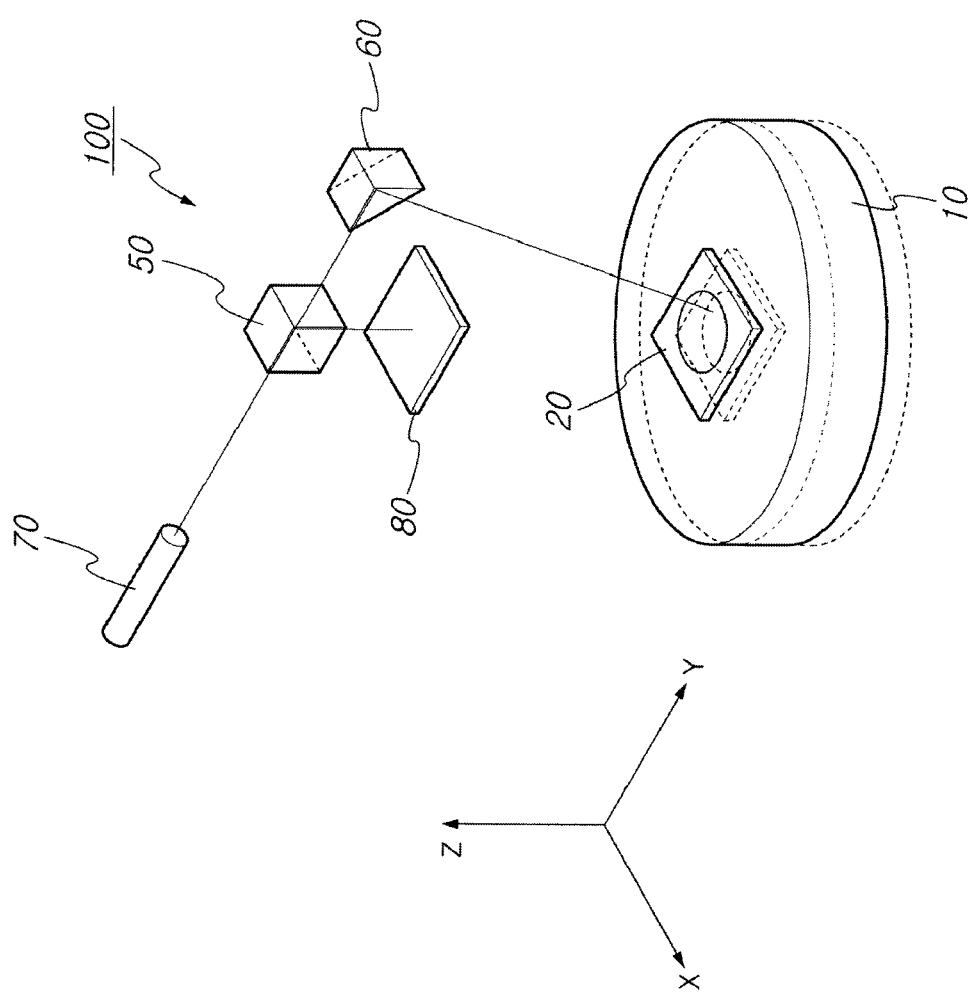
FIG. 3 is a diagram illustrating a positional error in a Z axis direction.
Figure 4:
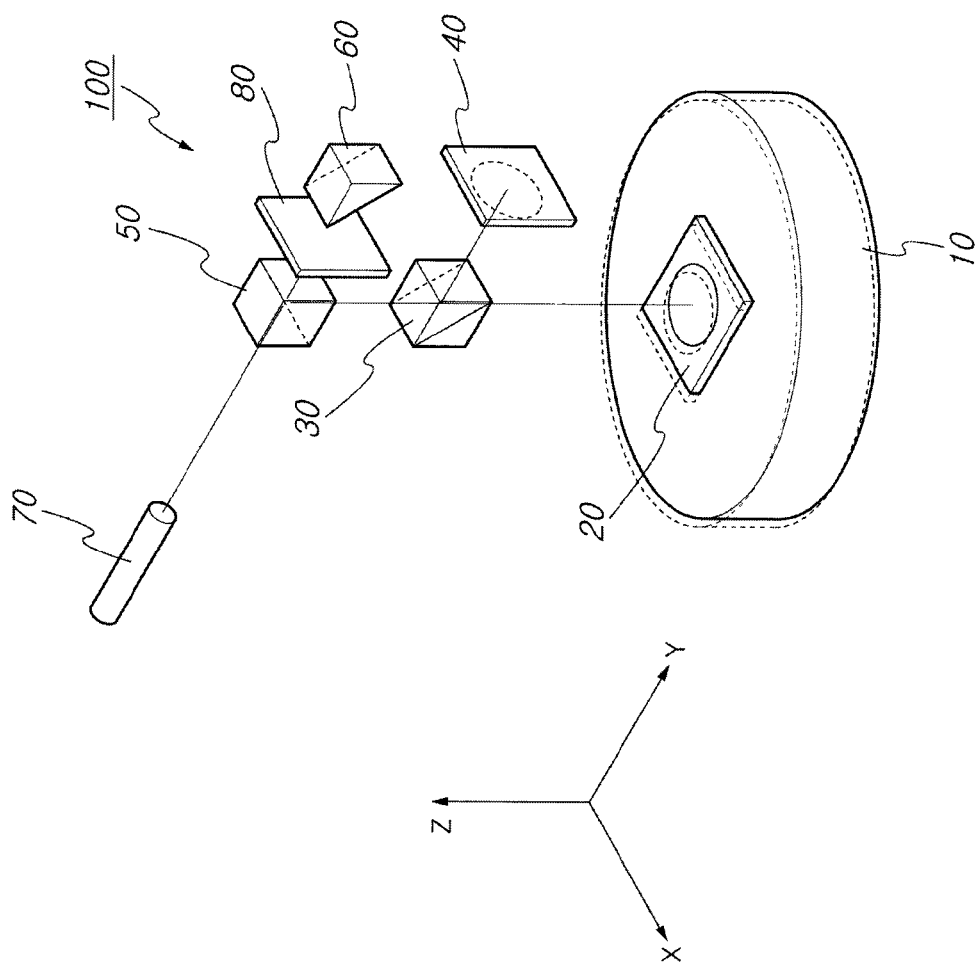
FIG. 4 is a diagram illustrating a positional error in the X and Y axis directions.

FIG. 1 is a diagram illustrating the first step measurement in the apparatus for measuring a quasi-static error of a rotation driving shaft according to the present invention, FIG. 2 is a diagram illustrating the second step measurement in the apparatus for measuring a quasi-static error of a rotation driving shaft according to the present invention, FIG. 3 is a diagram illustrating a positional error in a Z axis direction, and FIG. 4 is a diagram illustrating a positional error in the X and Y axis directions.

Figure 5:
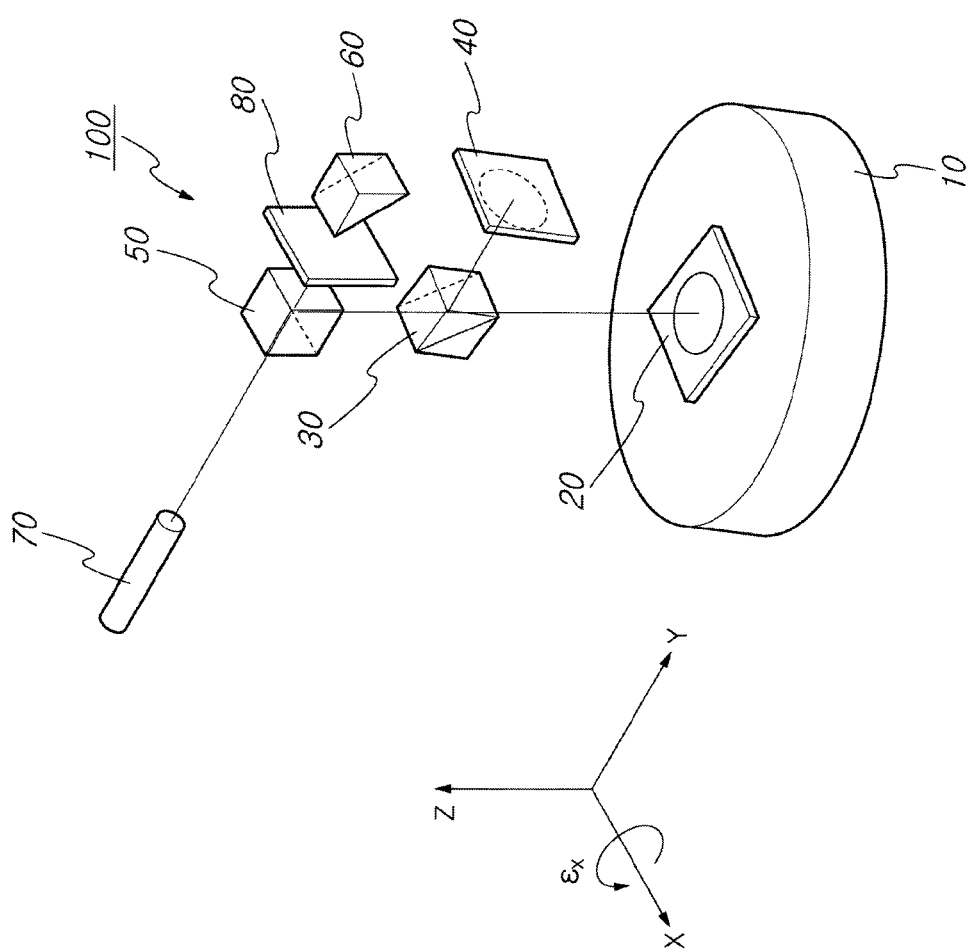
FIG. 5 is a diagram illustrating an angular error in an X axis direction.

Further, FIG. 5 is a diagram illustrating an angular error in an X axis direction, FIG. 6 is a diagram illustrating an angular error in a Z axis direction, and FIG. 7 is a diagram illustrating an angular error in a Y axis direction.

Referring to FIGS. 1 to 7, an apparatus 100 for measuring a quasi-static error according to the present invention has a driving shaft 10, a first position sensor 20, a first splitter 30, a second position sensor 40, a second splitter 50, a reflector 60, a laser driving device 70, and a blocking plate 80.

Here, the driving shaft 10 is an object for obtaining the positional error according to the displacement in the X, Y, and Z axis directions and the angular error according to the tilting with respect to the X, Y, and Z axis directions, which may simply be the driving shaft 10 or a rotatable body fixed to the driving shaft 10. However, it is assumed that the aforementioned object is the driving shaft 10 in the present embodiment for description.

The first position sensor 20 is fixed to an upper part of the driving shaft 10 in such a manner that the center points of the driving shaft 10 and the first position sensor 20 are identical. The first position sensor 20 collects the position change of the inputted laser beam and stores the position change as data, which preferably includes a Position Sensitive Detector (PSD).

The laser beam inputted to the first position sensor 20 is the straight directional laser beam component split from the first splitter 30 and the laser beam component reflected and outputted from the reflector 60.

In the meantime, the first splitter 30 that is spaced apart from the first position sensor 20 at a predetermined distance is fixed to the driving shaft 10 in a vertical direction of the first position sensor 20. An additional fixing bar or fixing frame can be included for fixing the driving shaft 10 and the first splitter 30.

The first splitter 30 receives the vertical directional laser beam that has been outputted from the laser driving device 70 and split from the second splitter 50 and spectralizes the received vertical directional laser beam component into a horizontal directional laser beam component and a straight directional laser beam component.

As described above, the straight directional laser beam component split from the first splitter 30 is inputted to the first position sensor 20.

Further, it is a matter of course that the center points of the first position sensor 20 and first splitter 30 are disposed vertically concentric to each other, so that the straight directional laser beam component split from the first splitter 30 can be inputted to the center point of the first position sensor 20 when the driving shaft 10 does not rotate.

Further, the horizontal directional laser beam component split from the first splitter 30 is inputted to the second position sensor 40, which is spaced apart from the first splitter 30 at a predetermined distance in a horizontal spectral direction, is fixed to the driving shaft 10, and rotates together with the driving shaft 10. The center points of the second position sensor 40 and first splitter 30 are disposed horizontally concentric to each other, so that the horizontal directional laser beam component split from the first splitter 30 can be inputted to the center point of the second position sensor 40 when the driving shaft 10 does not rotate.

The second splitter 50 is formed on an upper part of the first splitter 30 while being spaced apart from the first splitter 30 at a predetermined distance for inputting the laser beam component to the first splitter 30. The second splitter 50 also spectralizes the inputted laser beam into a straight directional laser beam component and a vertical directional laser beam component so that the vertical directional laser beam component is inputted to the first splitter 30.

It is a matter of course that the laser driving device 70 is horizontally disposed with the second splitter 50, a laser output center point and the center point of the second splitter 50 are disposed horizontally concentric to each other, and the center points of the second splitter 50, the first splitter 30, the first position sensor 20, and the driving shaft 10 are disposed vertically concentric to each other.

In the meantime, as shown in FIG. 2, the straight directional laser beam component spectrally outputted from the second splitter 50, i.e. the horizontal directional laser beam component, is inputted to the reflector 60 and reflected and outputted from the reflector 60 so that the horizontal directional laser beam component is irradiated on a point spaced apart from the center point of the first position sensor 20 at an 'a' distance when the driving shaft 10 does not rotate. The reflector 60 is also disposed on a horizontal extension line of the laser driving device 70 and second splitter 50 and is opposed to the laser driving device 70 based on the second splitter 50.

The laser beam components reflected from the reflector 60 and split from the first splitter 30 are inputted to the first position sensor 20. Because of this, the apparatus 100 for measuring the quasi-static error includes the blocking plate 80 for selectively receiving the laser beam component so as to prevent the laser beam component that are inputted to the first position sensor 20 from being duplicated.

The blocking plate 80 is disposed for selectively blocking the straight directional spectral laser beam component or vertical directional spectral laser beam component of the second splitter 50, so that the first position sensor 20 selectively receives the laser beam component.

As described above, the apparatus 100 for measuring the quasi-static error measures an error value through the positional error and the angular error according to the tilting of the driving shaft. More specifically, in the apparatus 100 for measuring the quasi-static error, if the driving shaft 10 does not rotate, the laser beam outputted from the laser driving device 70 is inputted to the center points of the first position sensor 20 and second position sensor 40 in the first step, and is inputted to a point spaced apart from the center point by the 'a' distance in the second step. However, if the driving shaft 10 rotates, the laser beam component is inputted in a different point due to the quasi-static error of the driving shaft 10.

By obtaining the laser input position change data and calculating its change value, the apparatus 100 for measuring the quasi-static error measures the displacement and the tilting of the driving shaft 10 with respect to the X, Y, and Z axis directions.

Here, the positional errors can be generated in the X, Y, and Z axis directions, respectively. The positional errors in the X and Y axis directions are measured through the laser input position change data measured by the first position sensor 20 and second position sensor 40 in the first step and the positional error in the Z axis direction is measured through the laser input position change data measured by the first position sensor 10 in the second step.

With respect to the angular errors according to the tilting of the driving shaft with respect to the X, Y, and Z axis directions, the angular errors in the X and Y axis directions are measured through the combination of the laser input position change data measured by the first position sensor 20 and second position sensor 40 in the first step and the angular error in the Z axis direction is measured through the combination of the laser input position change data measured by the first position sensor 20 in the first and second steps.

If the angular error is generated in one direction only among the X, Y, and Z axis directions, without obtaining the angular error through the combination of the measured data, the angular error in the X axis direction may be measured through the position change value in the Z axis direction of the second position sensor 40, the angular error in the Y axis direction is measured through the position change value in the X axis direction of the second position sensor 40, and the angular error in the Z axis direction is measured through the position change value of the first position sensor 20 measured in the second step.

However, the positional error and the angular error in the X, Y, and Z axis directions are actually generated at the same time and they are related with each other. Therefore, it is difficult to literally describe the method for obtaining the error value showing 100% accuracy in obtaining the specific error.

Therefore, the following equation is most appropriate for accurately describing the angular error and positional error simultaneously generated in each of the X, Y, and Z axis directions.

Hereinafter, there will be described a process for inducing the equation for obtaining the positional error and angular error in the X, Y, and Z axis directions through the input data of the first position sensor 20 and second position sensor 40.

First, it is basically assumed that the local coordinates of the rotating driving shaft 10 and first position sensor 20 are identically set and a reference coordinates is identically set with the local coordinates of the rotation driving shaft 10 when an input is 0.

In schematically summarizing the process of inducing the equation, the reference coordinates is first set, an error model of the rotation driving shaft with respect to the reference coordinates is created, a plane equation is induced for each of the first and second position sensors, and an equation of a straight-line of a laser beam irradiated to each of the first and second position sensors is induced.

Next, an intersection point of the induced straight line and plane is obtained, the obtained intersection point is converted to the local coordinates of each of the first and second position sensors, and the final equation is induced.

To specifically describe the induction of the above equation, first, the local coordinates of the first position sensor after the rotation driving shaft (including a geometric error) rotates in a predetermined angle is obtained by a transformation matrix with respect to a reference coordinates, which is defined by equation (1) below.

$$R_1 = \begin{bmatrix} \cos\theta - \sin\theta\varepsilon_z & -\sin\theta - \cos\theta\varepsilon_z & \varepsilon_y & \delta_x \\ \sin\theta + \cos\theta\varepsilon_z & \cos\theta - \sin\theta\varepsilon_z & -\varepsilon_x & \delta_y \\ \sin\theta - \cos\theta\varepsilon_y & \sin\theta\varepsilon_y + \cos\theta\varepsilon_x & 1 & \delta_z \\ 0 & 0 & 0 & 1 \end{bmatrix} \quad (1)$$

In equation (1), $\theta$ is a rotation angle of the rotation driving shaft, $\epsilon_x$, $\epsilon_x$, and $\epsilon_x$ are the angular errors in the X, Y, and Z axis directions, respectively, and $\delta_x$, $\delta_y$, and $\delta_z$ are the positional errors in the X, Y, and Z axis directions, respectively.

Next, the local coordinates of the second position sensor after the rotation driving shaft (including a geometric error) rotates in a predetermined angle is obtained by a transformation matrix with respect to the reference coordinates, which is defined by equation (2) below.

$$R_2 = \begin{bmatrix} \cos\theta - \sin\theta\varepsilon_z & -\sin\theta - \cos\theta\varepsilon_z & \varepsilon_y & \delta_x + H_1\varepsilon_y + H_2(-\sin\theta - \cos\theta\varepsilon_z) \\ \sin\theta + \cos\theta\varepsilon_z & \cos\theta - \sin\theta\varepsilon_z & -\varepsilon_x & \delta_y - H_1\varepsilon_x + H_2(\cos\theta - \sin\theta\varepsilon_z) \\ \sin\theta - \cos\theta\varepsilon_y & \sin\theta\varepsilon_y + \cos\theta\varepsilon_x & 1 & \delta_z + H_1 + H_2(\sin\theta\varepsilon_y + \cos\theta\varepsilon_x) \\ 0 & 0 & 0 & 1 \end{bmatrix} \quad (2)$$

In equation (2), $H_1$ is the shortest distance between the driving shaft and the second position sensor and $H_2$ is the shortest distance between a point that is the shortest distance between the driving shaft and the second position sensor and the center point of the driving shaft.

Next, a plane equation of the first position sensor after the rotation driving shaft rotates in a predetermined angle is obtained with respect to the reference coordinates, which is defined by equation (3) below.

$$\epsilon_y x - \epsilon_x y + z = \delta_z \quad (3)$$

A plane equation of the second position sensor after the rotation driving shaft rotates in a predetermined angle is obtained with respect to the reference coordinates, which is defined by equation (4) below.

$$(-\sin\theta - \cos\theta\epsilon_z)x + (\cos\theta - \sin\theta\epsilon_z)y + (\sin\theta\epsilon_y \cos\theta\epsilon_x)z = H_2 - \delta_y \sin\theta + \delta_y \cos\theta \quad (4)$$

An equation of a straight line of the laser beam component from the second splitter to the first position sensor is obtained with respect to the reference coordinates, which is defined by equation (5) below.

$$x = y = 0, z = t \text{ for } \forall t \in R \quad (5)$$

Next, an equation of a straight line of the laser beam from the reflector to the first position sensor is obtained with respect to the reference coordinates, which is defined by equation (6) below.

$$x = 0, y = t, z = (t - \alpha)\tan\beta \text{ for } \forall t \in R \quad (6)$$

In equation (6), $\beta$ is an incidence angle of the first position sensor of the spectral laser beam component reflected from the reflector and $\alpha$ is the distance between an incidence point of the first position sensor of the spectral laser beam component reflected from the reflector and the center point of the first position sensor.

An equation of a straight line of the laser beam component from the first splitter to the second position sensor after the rotation driving shaft rotates in a predetermined angle is obtained with respect to the reference coordinates, which is defined by equation (7) below.

$$\text{for } \forall t \in R \quad (7)$$
$$x = (-\sin\theta - \sin\theta\cos\theta\varepsilon_x + \cos^2\theta\varepsilon_y - \cos\theta\varepsilon_z)t$$
$$y = (\cos\theta - \sin^2\theta\varepsilon_x + \sin\theta\cos\theta\varepsilon_y - \sin\theta\varepsilon_z)t$$
$$z = 2(\cos\theta\varepsilon_x + \sin\theta\varepsilon_y)t + \frac{H_1 - \sin\theta\varepsilon_x + \cos\theta\varepsilon_y + \delta_z}{1 + \cos\theta\varepsilon_x + \sin\theta\varepsilon_z}$$

A point (an intersection point between equation (3) and equation (5)) where the laser beam component after the rotation of the rotation driving shaft in a predetermined angle meets the first position sensor is obtained with respect to the reference coordinates, which is defined by equation (8) below.

$$(0, 0, \delta_z) \quad (8)$$

A point (an intersection point between equation (3) and equation (6)) where an inclined laser beam component after the rotation of the rotation driving shaft in a predetermined angle meets the first position sensor is obtained with respect to the reference coordinates, which is defined by equation (9) below.

$$\frac{1}{\tan\beta - \varepsilon_x}(0,\ a\tan\beta + \delta_z,\ a\varepsilon_x\tan\beta + \delta_z\tan\beta) \quad (9)$$

A point (an intersection point between equation (4) and equation (7)) where the horizontal directional laser beam component after the rotation of the rotation driving shaft in a predetermined angle meets the second position sensor is obtained with respect to the reference coordinates, which is defined by equation (10) below.

$$AX = B,\text{ wherein}$$

$$A = \begin{bmatrix} -\tan\beta\cos\theta & -\tan\beta\sin\theta & \sin\theta & x_1 & 0 & -a\tan\beta\cos\theta \\ \tan\beta\sin\theta & -\tan\beta\cos\theta & \cos\theta & y_1 & 0 & -a\tan\beta\sin\theta \\ -\cos\theta & -\sin\theta & 0 & 0 & 0 & 0 \\ \sin\theta & -\cos\theta & 0 & 0 & 0 & 0 \\ -\cos\theta & -\sin\theta & 0 & \sin\theta H_1 - \sin\theta H_2 - x_3\cos\theta & -\cos\theta H_1 + \cos\theta H_2 - x_3\sin\theta & 0 \\ -\sin\theta & \cos\theta & 0 & -\cos\theta H_1 + \cos\theta H_2 - z_3\cos\theta & -\sin\theta H_1 + \sin\theta H_2 - z_3\sin\theta & 0 \end{bmatrix},$$

$$X = \begin{bmatrix} \delta_x \\ \delta_y \\ \delta_z \\ \varepsilon_x \\ \varepsilon_y \\ \varepsilon_z \end{bmatrix},\text{ and } B = \begin{bmatrix} \tan\beta x_1 - a\tan\beta\sin\theta \\ \tan\beta y_1 - a\tan\beta\cos\theta \\ x_2 \\ y_2 \\ x_3 \\ z_3 \end{bmatrix},$$

$$x = (-\sin\theta - \sin\theta\cos\theta\varepsilon_x + \cos^2\theta\varepsilon_y - \cos\theta\varepsilon_z)t \quad (10)$$

$$y = (\cos\theta - \sin^2\theta\varepsilon_x + \sin\theta\cos\theta\varepsilon_y - \sin\theta\varepsilon_z)t$$

$$z = 2(\cos\theta\varepsilon_x + \sin\theta\varepsilon_y)t + \frac{H_1 - \sin\theta\delta_x + \cos\theta\delta_y + \delta_z}{1 + \cos\theta z_x + \sin\theta z_y}$$

$$t = H_2 - H_1 + \frac{H_1 - \sin\theta\delta_x + \cos\theta\delta_y}{1 + \cos\theta\varepsilon_x + \sin\theta\varepsilon_y}$$

A point (an intersection point between equation (3) and equation (5)) where the vertical directional laser beam component after the rotation of the rotation driving shaft in a predetermined angle meets the first position sensor is obtained with respect to the local coordinates of the first position sensor, which is defined by equation (11) below.

$$(-\cos\theta\delta_x - \sin\theta\delta_y,\ \sin\theta\delta_x - \cos\theta\delta_y, 0) \quad (11)$$

Further, a point (an intersection point between equation (3) and equation (6)) where the inclined laser beam component after the rotation of the rotation driving shaft in a predetermined angle meets the first position sensor is obtained with respect to the local coordinates of the first position sensor, which is defined by equation (12) below.

$$\frac{1}{\tan\beta - \varepsilon_x}\begin{pmatrix} a\tan\beta\sin\theta - \tan\beta\cos\theta\delta_x - \tan\beta\sin\theta\delta_y + \sin\theta\delta_z + \\ a\tan\beta\cos\theta\varepsilon_z,\ a\tan\beta\cos\theta + \tan\beta\sin\theta\delta_x - \\ \tan\beta\cos\theta\delta_y + \cos\theta\delta_z - a\tan\beta\sin\theta\varepsilon_x,\ 0 \end{pmatrix} \quad (12)$$

A point (an intersection point between equation (4) and equation (7)) where the horizontal directional laser beam component meets the second position sensor after the rotation driving shaft rotates in a predetermined angle is obtained with respect to the local coordinates of the second position sensor, which is defined by equation (13) below.

$$\frac{1}{1 + \cos\theta\varepsilon_x + \sin\theta\varepsilon_y}\begin{pmatrix} -\cos\theta\delta_x - \sin\theta\delta_y + \sin\theta(H_1 - H_2)\varepsilon_x - \\ \cos\theta(H_1 - H_2)\varepsilon_y,\ 0,\ -\sin\theta\delta_x + \\ \cos\theta\delta_y - \cos\theta(H_1 - H_2)\varepsilon_x - \\ \sin\theta(H_1 - H_2)\varepsilon_y \end{pmatrix} \quad (13)$$

Therefore, an equation below can be defined from equations (11), (12), and (13).

In the above equations, $x_1$ is an output value in the X direction of the first position sensor in the first step, $y_1$ is an output value in the Y direction of the first position sensor in the first step, $x_2$ is an output value in the X direction of the first position sensor in the second step, $y_2$ is an output value sensor in the Y direction of the first position sensor in the second step, $x_3$ is an output value in the X direction of the second position sensor in the first step, and $z_3$ is an output value in the Z direction of the second position sensor in the first step.

The foregoing is merely an exemplary embodiment of the technical sprit of the present invention and it will be readily understood by those skilled in the art that various modifications and changes can be made thereto within the technical spirit and scope of the present invention.

The protection scope of the present invention shall be interpreted by the appended claims and every technical sprit within its equivalent scope.

The invention claimed is:

1. An apparatus for measuring a quasi-static error for measuring a positional error and an angular error generated in each of X, Y, and Z axis directions of a rotating driving shaft through a position detection sensor for sensing an input position of a laser beam, the apparatus comprising:
   a first position sensor for sensing the input position of the laser beam, the first position sensor being disposed on a center of an upper surface of the driving shaft;
   a first splitter for spectrally outputting an inputted laser beam as a straight directional laser beam component and horizontal directional laser beam component so that the straight directional laser beam component is inputted to the first position sensor, the first splitter being spaced apart from the first position sensor at a predetermined distance on an extension line of an upper part of the driving shaft and fixed to the driving shaft to rotate together with the driving shaft;

a second position sensor spaced apart from the first splitter at a predetermined distance in a horizontal spectral direction of the first splitter so as to receive the horizontal directional laser beam component spectrally outputted from the first splitter and fixed to the driving shaft to rotate together with the driving shaft;

a second splitter for spectralizing the inputted laser beam into a straight directional laser beam component and down-vertical directional laser beam component, the second splitter being spaced apart from an upper part of the first splitter on an extension line of the upper part of the driving shaft;

a reflector for receiving the straight directional laser beam component split from the second splitter and reflecting the received laser beam component to the first position sensor;

a laser driving device disposed on a same horizontal extension line of the second splitter and reflector and opposed to the reflector based on the second splitter, to irradiate the laser beam to the second splitter; and a blocking plate for selectively blocking the straight directional or vertical directional laser beam component split from the second splitter.

2. The apparatus as claimed in claim 1, wherein the apparatus sequentially performs:

a first step in which the blocking plate located between the second splitter and the reflector blocks the horizontal directional laser beam component spectrally outputted from the second splitter so that the vertical directional laser beam component outputted from the second splitter is inputted to the first position sensor and second position sensor through the first splitter; and a second step in which the blocking plate located between the second splitter and the first splitter blocks the vertical directional laser beam component spectrally outputted from the second splitter so that the laser beam component is inputted to the first position sensor through the reflector.

3. The apparatus as claimed in claim 2, wherein the positional error generated in each of X and Y axis directions is obtained through a laser input position change data measured by the first position sensor and second position sensor in the first step.

4. The apparatus as claimed in claim 3, wherein the positional errors and the angular errors in the X, Y, and Z axis directions are obtained by an equation defined by $$AX = B, \text{ wherein}$$

$$A = \begin{bmatrix} -\tan\beta\cos\theta & -\tan\beta\sin\theta & \sin\theta & x_1 & 0 & -a\tan\beta\cos\theta \\ \tan\beta\sin\theta & -\tan\beta\cos\theta & \cos\theta & y_1 & 0 & -a\tan\beta\sin\theta \\ -\cos\theta & -\sin\theta & 0 & 0 & 0 & 0 \\ \sin\theta & -\cos\theta & 0 & 0 & 0 & 0 \\ -\cos\theta & -\sin\theta & 0 & \sin\theta H_1 - \sin\theta H_2 - x_3\cos\theta & -\cos\theta H_1 + \cos\theta H_2 - x_3\sin\theta & 0 \\ -\sin\theta & \cos\theta & 0 & -\cos\theta H_1 + \cos\theta H_2 - z_3\cos\theta & -\sin\theta H_1 + \sin\theta H_2 - z_3\sin\theta & 0 \end{bmatrix},$$

$$X = \begin{bmatrix} \delta_x \\ \delta_y \\ \delta_z \\ \varepsilon_x \\ \varepsilon_y \\ \varepsilon_z \end{bmatrix}, \text{ and } B = \begin{bmatrix} \tan\beta x_1 - a\tan\beta\sin\theta \\ \tan\beta y_1 - a\tan\beta\cos\theta \\ x_2 \\ y_2 \\ x_3 \\ z_3 \end{bmatrix},$$

wherein $\theta$ is a rotation angle of the rotation driving shaft, $\beta$ is an incidence angle of the first position sensor of the spectral laser beam reflected from the reflector, $\alpha$ is the distance between the incidence point of the first position sensor of the spectral laser beam reflected from the reflector and the center point of the first position sensor, H1 is the shortest distance between the driving shaft and the second position sensor, H2 is the shortest distance between a point that is the shortest distance between the driving shaft and the second position sensor and the center point of the driving shaft, $\epsilon x$, $\epsilon y$, and $\epsilon z$ are the angular errors in the X, Y, and Z axis directions, respectively, $\delta x$, $\delta y$, and $\delta z$ are the positional errors in the X, Y, and Z axis directions, respectively, x1 is an output value in the X direction of the first position sensor in the first step, y1 is an output value in the Y direction of the first position sensor in the first step, x2 is an output value in the X direction of the first position sensor in the second step, y2 is an output value sensor in the Y direction of the first position sensor in the second step, x3 is an output value in the X direction of the second position sensor in the first step, and z3 is an output value in the Z direction of the second position sensor in the first step.

5. The apparatus as claimed in claim 2, wherein the positional error generated in a Z axis direction is obtained through a laser input position change data measured by the first position sensor in the second step.

6. The apparatus as claimed in claim 5 wherein the positional errors and the angular errors in the X, Y, and Z axis directions are obtained by an equation defined by $$AX = B, \text{ wherein}$$

$$A = \begin{bmatrix} -\tan\beta\cos\theta & -\tan\beta\sin\theta & \sin\theta & x_1 & 0 & -a\tan\beta\cos\theta \\ \tan\beta\sin\theta & -\tan\beta\cos\theta & \cos\theta & y_1 & 0 & -a\tan\beta\sin\theta \\ -\cos\theta & -\sin\theta & 0 & 0 & 0 & 0 \\ \sin\theta & -\cos\theta & 0 & 0 & 0 & 0 \\ -\cos\theta & -\sin\theta & 0 & \sin\theta H_1 - \sin\theta H_2 - x_3\cos\theta & -\cos\theta H_1 + \cos\theta H_2 - x_3\sin\theta & 0 \\ -\sin\theta & \cos\theta & 0 & -\cos\theta H_1 + \cos\theta H_2 - z_3\cos\theta & -\sin\theta H_1 + \sin\theta H_2 - z_3\sin\theta & 0 \end{bmatrix},$$

$$X = \begin{bmatrix} \delta_x \\ \delta_y \\ \delta_z \\ \varepsilon_x \\ \varepsilon_y \\ \varepsilon_z \end{bmatrix}, \text{ and } B = \begin{bmatrix} \tan\beta x_1 - a\tan\beta\sin\theta \\ \tan\beta y_1 - a\tan\beta\cos\theta \\ x_2 \\ y_2 \\ x_3 \\ z_3 \end{bmatrix},$$

wherein θ is a rotation angle of the rotation driving shaft, β is an incidence angle of the first position sensor of the spectral laser beam reflected from the reflector, α is the distance between the incidence point of the first position sensor of the spectral laser beam reflected from the reflector and the center point of the first position sensor, H1 is the shortest distance between the driving shaft and the second position sensor, H2 is the shortest distance between a point that is the shortest distance between the driving shaft and the second position sensor and the center point of the driving shaft, ϵx, ϵy, and ϵz are the angular errors in the X, Y, and Z axis directions, respectively, δx, δy, and δz are the positional errors in the X, Y, and Z axis directions, respectively, x1 is an output value in the X direction of the first position sensor in the first step, y1 is an output value in the Y direction of the first position sensor in the first step, x2 is an output value in the X direction of the first position sensor in the second step, y2 is an output value sensor in the Y direction of the first position sensor in the second step, x3 is an output value in the X direction of the second position sensor in the first step, and z3 is an output value in the Z direction of the second position sensor in the first step.

7. The apparatus as claimed in claim 2, wherein the angular error in each of X and Y axis directions is obtained through combination of laser input position change data measured by the first position sensor and second position sensor in the first step and the angular error in a Z axis direction is obtained through combination of laser input position change data measured by the first position sensor in the first step and second step.

8. The apparatus as claimed in claim 7 wherein the positional errors and the angular errors in the X, Y, and Z axis directions are obtained by an equation defined by $$AX = B, \text{ wherein}$$

$$A = \begin{bmatrix} -\tan\beta\cos\theta & -\tan\beta\sin\theta & \sin\theta & x_1 & 0 & -a\tan\beta\cos\theta \\ \tan\beta\sin\theta & -\tan\beta\cos\theta & \cos\theta & y_1 & 0 & -a\tan\beta\sin\theta \\ -\cos\theta & -\sin\theta & 0 & 0 & 0 & 0 \\ \sin\theta & -\cos\theta & 0 & 0 & 0 & 0 \\ -\cos\theta & -\sin\theta & 0 & \sin\theta H_1 - \sin\theta H_2 - x_3\cos\theta & -\cos\theta H_1 + \cos\theta H_2 - x_3\sin\theta & 0 \\ -\sin\theta & \cos\theta & 0 & -\cos\theta H_1 + \cos\theta H_2 - z_3\cos\theta & -\sin\theta H_1 + \sin\theta H_2 - z_3\sin\theta & 0 \end{bmatrix},$$

$$X = \begin{bmatrix} \delta_x \\ \delta_y \\ \delta_z \\ \varepsilon_x \\ \varepsilon_y \\ \varepsilon_z \end{bmatrix}, \text{ and } B = \begin{bmatrix} \tan\beta x_1 - a\tan\beta\sin\theta \\ \tan\beta y_1 - a\tan\beta\cos\theta \\ x_2 \\ y_2 \\ x_3 \\ z_3 \end{bmatrix},$$

wherein θ is a rotation angle of the rotation driving shaft, β is an incidence angle of the first position sensor of the spectral laser beam reflected from the reflector, α is the distance between the incidence point of the first position sensor of the spectral laser beam reflected from the reflector and the center point of the first position sensor, H1 is the shortest distance between the driving shaft and the second position sensor, H2 is the shortest distance between a point that is the shortest distance between the driving shaft and the second position sensor and the center point of the driving shaft, ϵx, ϵy, and ϵz are the angular errors in the X, Y, and Z axis directions, respectively, δx, δy, and δz are the positional errors in the X, Y, and Z axis directions, respectively, x1 is an output value in the X direction of the first position sensor in the first step, y1 is an output value in the Y direction of the first position sensor in the first step, x2 is an output value in the X direction of the first position sensor in the second step, y2 is an output value sensor in the Y direction of the first position sensor in the second step, x3 is an output value in the X direction of the second position sensor in the first step, and z3 is an output value in the Z direction of the second position sensor in the first step.

* * * * *